United States Patent Office 3,705,149
Patented Dec. 5, 1972

3,705,149
METHOD FOR OBTAINING A DYE FREE, WATER SOLUBLE DYED SUBSTRATE FOR AMYLASE ASSAY
Arthur L. Babson, Morristown, and Susan R. Tenney, Chester, N.J., assignors to Warner-Lambert Company, Morris Plains, N.J.
No Drawing. Filed Apr. 7, 1971, Ser. No. 132,232
Int. Cl. C08b *19/04, 25/02*
U.S. Cl. 260—233.3 R     11 Claims

ABSTRACT OF THE DISCLOSURE

Water soluble, dyed substrates from which all unreacted dye has been removed are obtained by coupling a reactive dye to a starch or starch fraction in an alkaline solution, neutralizing the reaction mixture, and removing all unreacted dye by a multiple precipitation process conducted at a controlled temperature, wherein the dyed substrate is precipitated, re-dissolved, and re-precipitated until the fluid from the last precipitation is free from dye color. Should the supernatant fluid contain dye color, the re-dissolving and re-precipitating of the dyed substrate must be continued. By conducting the purification procedure at a low temperature and utilizing a salt solution, it is possible to precipitate the dyed substrate with a relatively dilute alcohol solution, which does not interfere with the re-dissolving of the dyed substrate. Suitably, the multiple precipitation process is carried out, at about 4° C., by adding to the dyed substrate reaction mixture containing a salt concentration of from 0.34% to 1.04%, an aqueous alcohol solution which provides a final concentration of 11.5% to 18% alcohol in the total precipitation mixture; removing the supernatant fluid containing salt and free dye to obtain a partially purified dyed substrate precipitate; re-dissolving this precipitate in one of the following solutions: an aqueous solution, an aqueous salt solution which provides up to 4.5% salt in the total volume of dyed substrate solution, an aqueous alcohol solution which provides up to 21% alcohol in the total volume of the dyed substrate solution or an aqueous solution containing less than 0.14% salt and less than 10.5% alcohol; and re-precipitating the dyed substrate by adjusting the concentrations of salt and alcohol in the dyed substrate solution to 0.34% to 1.04% and 11.5% to 18%, respectively. The precipitation/re-dissolving purification procedure is continued until all free dye has been removed and the water soluble, dyed substrate obtained is suitable for use in an improved amylase procedure.

BACKGROUND OF THE INVENTION

Starch, a polysaccharide, whose empirical formula is $(C_6H_{10}O_5)n$ is a polymeric material comprising essentially an amylose fraction of the formula:

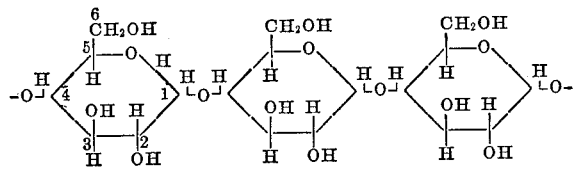

and an amylopectin fraction of the formula:

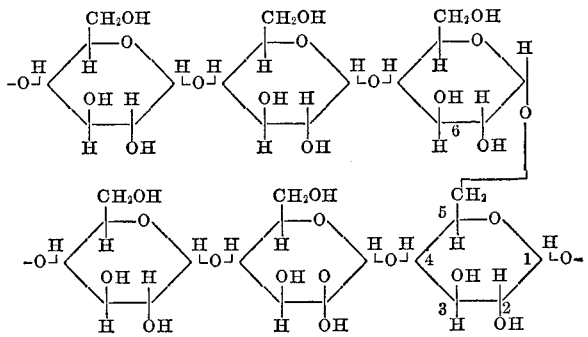

The amylases are enzymes which catalyze the hydrolysis of starch. The amylases are of two types, α-amylase which can hydrolyze both the α-1,4 and α-1,6 linkages of amylose and amylopectin, respectively, and can therefore hydrolyze starch completely and β-amylase which can hydrolyze only the α-1,4 linkage of the amylose thus leaving the α-1,6 linkage of amylopectin unchanged. The action of α-amylase is to hydrolyze both the amylose and amylopectin randomly which produces progressively smaller polysaccharide fragments until nothing remains but maltose and perhaps some glucose. α-Amylase is activated by chloride ions and has optimum activity at a pH of about 7.

The amylases of animal origin are of the α-amylase type. Their presence has been demonstrated in many tissues, but they are primarily produced by the pancreas and salivary glands. The function of the amylase present in the secretions of these glandular tissues is to aid in the digestion of starch by hydrolyzing or splitting the starch into smaller molecules which can then be absorbed and assimilated.

While for over 100 years amylase has been known to be present in the blood stream, the exact body source of this enzyme in normal serum has not been established. The source is apparently not in the pancreas and salivary glands as removal of these glands has a negligible effect on normal serum amylase levels.

The determination of amylase activity in body fluids is becoming increasingly important. Elevated amylase levels in blood serum have been observed in a number of pathological conditions, but the most spectacular rise in serum amylase levels has been seen in acute pancreatitis where sudden increases to 30 or 40 times the normal level are not uncommon. In chronic pancreatitis, the increases are moderate and a substantial number of patients may actually have normal levels. Moderate elevations in serum amylase have also been seen in perforated peptic ulcer patients and in intestinal obstruction disorders, wherein the increased amylase is probably caused by leakage of the enzymes from the intestinal tract into the peritoneal cavity and reabsorption from this cavity into the general circulation. Moderate elevations are also seen in mumps, renal insufficiency and cancer of the pancreas. Hepatobiliary disease is characterized by low levels of serum amylase.

Classical methods for the determination of amylase activity include the amyloclastic method, wherein the decrease in viscosity or turbidity of a starch suspension liquefied by a test sample containing amylase is read as amylase activity; and a modified version of the saccharogenic method wherein a sample containing amylase is incubated with starch, and reducing sugars formed are determined and reported as Somogyi Units. Even though the modified saccharogenic method for amylase determination is considered much more accurate than the amyloclastic method, the saccharogenic method is basically very time consuming, complex, and requires that a large and variable blank of preformed reducing sugar be determined. In addition, unhydrolyzed starch often creates turbidity and interferes with the determination of reducing sugars.

Thus, it is apparent that genuine and serious need does exist for a simple, rapid, and accurate method for the determination of amylase activity. Such an improved method for assaying amylase activity has recently been found and is described in our co-pending application, Ser. No. 771,354, filed Oct. 28, 1968, now U.S. Pat. No. 3,597,-322, issued Aug. 3, 1971. In this improved amylase assay, a water soluble, dyed substrate is incubated with a relatively small sample of fluid containing an unknown concentration of amylase, under controlled time and temperature conditions; after a certain period of time the undigested dyed substrate and any protein matter present in the fluid sample is precipitated out by the addition of an alcoholic tannic acid precipitating agent, at a controlled pH and temperature; and the optical density of the remaining clear but now colored supernatant liquid is measured for the determination of amylase activity. The improved sensitivity of this new method for determining amylase activity stems chiefly from the use of a water soluble, dyed substrate, which is more readily hydrolyzed by small quantities of amylase.

The water soluble, dyed substrate used in the assay is prepared by coupling, in an aqueous alkaline solution, a suitable reactive dye with a suitable starch or starch fraction, in order to obtain a water soluble dyed starch product. The product obtained is then subjected to gel filtration and dialysis treatment to remove all unreacted dye; the presence of any free dye in the substrate seriously interferes with test results, since the measure of amylase activity in this assay is by means of optical density. In order to insure that all free dye is completely removed from the dyed substrate during the purification process, a selective precipitating agent for the dyed substrate is added to samples of successive fractions of purified solutions. An alcoholic tannic acid precipitating agent, used at a controlled pH and temperature has been found to precipitate out all the water-soluble dyed substrate: the presence of dye color in the remaining supernatant fluid indicates that some free dye remains and purification is incomplete.

The properties of this alcoholic tannic acid precipitating agent are critical: solutions containing from 0.5% to 2% tannic acid in 50% alcohol, buffered to a pH of 5.0 to 5.5, and brought to a temperature of 20° C. to 30° C. are effective. Most preferably, an alcoholic tannic acid solution of 50% methanol containing 1% tannic acid is buffered to a pH of 5.35 with a 0.1 N benzoic acid/sodium benzoate buffer and brought to a temperature of 25° C.

The details of the preparation and purification of the water soluble dyed substrate used in the improved amylase assay are covered in a co-pending application, U.S. Ser. No. 100,373, filed Dec. 21, 1970. Although the method for purifying the dyed substrate and monitoring the purification process described in the co-pending application have proven most effective, there are certain disadvantages. For example, the dialysis purification process takes approximately one week before a purified solution of the dyed substrate is obtained. In the gel filtration purification process, the eluant has to be collected in successive fractions and a sample of each fraction must be tested in order to be sure that no free dye remains. Obviously these procedures are time consuming and costly.

SUMMARY OF THE INVENTION

Unreacted dye is completely removed from water soluble, dyed substrates by a multiple precipitation process, conducted at a controlled temperature, wherein there is added to a reaction mixture of a water-soluble dyed substrate, which contains .14%–4.5% salt from neutralization, an aqueous alcohol solution which provides a final concentration of 10.5% to 34% alcohol in the total reaction mixture to precipitate the dyed substrate, removing the supernatant fluid containing salt and free dye to obtain the partially purified dyed substrate precipitate; re-dissolving this precipitate in one of the following solutions: an aqueous solution, an aqueous salt solution which provides up to 4.5% salt in the total volume of dyed substrate solution, an aqueous alcohol solution which provides up to 34% alcohol in the total volume of dyed substrate solution or an aqueous solution containing less than 0.14% salt and less than 10.5% alcohol; and re-precipitating the dyed starch substrate by adjusting the final concentration of salt to 0.14% to 4.5%, and the final concentration of alcohol to 10.5% to 34%. The precipitation/re-dissolving purification procedure, which is preferably conducted at 4° C., is continued until all free dye has been removed from the water soluble dyed substrate.

DESCRIPTION OF THE INVENTION

It has now been found that water soluble dyed substrates, completely free of unreacted dye, may be obtained by an improved process wherein the unreacted dye is removed by a multiple precipitation process: the dyed substrate is precipitated, re-dissolved and re-precipitated until the supernatant fluid from the last precipitation contains no dye color. The products which are obtained by this process are suitable for use in an improved amylase assay procedure described in U.S. Ser. No. 771,354, filed Oct. 28, 1968.

The reactive dyes useful in the practice of this invention are widely known in the cellulosic textile dyeing art, and, as brought out in that art, can be of various dyestuff classes, for example, azo, complex metal azo, anthraquinone, phthalocyanine, dioxazine or formazyl dyestuff, which, in particular, can also contain a sulfo group.

These dyes are sold, for example by Ciba Co., Inc. under their trade name "Cibacron," by Imperial Chemical Industries Limited under their trade name "Procion," by Farbwerke Hoechst A.G. under their trade name "Remazol," by Sandoz under their trade name "Drimarene," and by Geigy under their trade name "Reactone."

In general these reactive dyes have the following structural formulas:

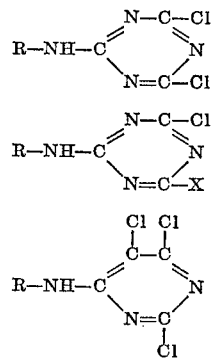

wherein R is a chromophor derived from the various classes of dyestuffs such as the azo, anthraquinone, formazyl or phthalocyanine structures mentioned and X is halogen or can be an inactive radical which may contain a solubilizing group. Examples of such reactive dyes are those that are described, for example, in U.S. Pat. Nos. 2,820,785; 2,889,316; 2,891,941; 2,892,828; 2,979,498; 3,054,795; 3,036,058; 3,149,100; 3,127,232 and the like.

The reactive groups of these dyestuffs contain at least one substituent which, under fixing conditions, splits off as an anion. The reactive group can consist, for example, of the radical of a cyclic carbamide halide which contains at least one mobile halogen atom bound to a carbon atom in the ring which is adjacent to a tertiary ring nitrogen atom. The reactive group can consist, in particular, of an azine ring of aromatic character which contains at least two tertiary ring nitrogen atoms and at least one mobile halogen atom bound to ring carbon adjacent to such nitrogen atoms such as, e.g. chlorine or bromine; examples of such reactive groups are mono-, di- or trihalogen diazinyl or mono- or di-halogen triazinyl groups.

The starch which is suitable for use in the practice of this invention can be obtained from potato, tapioca, corn, wheat, rice, sweet potato, waxy maize, or any other source which may be dyed in accordance with the process of this invention to yield the desired soluble dyed substrate. Solubility characteristics of the starch starting material may vary over a wide range but the dyed final product must be water-soluble for use on the assay of this invention. Amylose and amylopectin are commercially available as carefully standardized fractions, obtained from starch in the following manner: dilute starch pastes containing 2-3% of starch are autoclaved. The hot starch solution is saturated with an alcohol such as butanol or pentanol, in order to precipitate out essentially amylose, the straight chain fraction of starch, which gives an intense blue color with iodine. The main body of the starch present, not separated by this butanol treatment, is the amylopectin or branched chain fraction of starch which gives a red color with iodine. In the preferred embodiment of this invention, amylopectin is the fraction used.

While it is not necessary that the starch starting material be soluble in water to any great extent, it has been found that it is critical that the dyed substrate product obtained for use in the improved assay procedure be soluble in water. The use of a dyed, water-soluble substrate provides a technically superior assay which is simple and fast, yet sufficiently sensitive to insure accuracy and reliability. For this reason, although insoluble or relatively insoluble starches can be reacted with a suitable reactive dye to yield a soluble product, the preferred embodiment of this invention utilizes amylopectin, the soluble starch fraction, as the starting material. The preferred amylopectin is sold commercially by National Starch and Chemical Corporation as Amioca 51-6002. Again, since this material is soluble it is possible to use a variety of the suitable reactive dyes and be assured that a water-soluble dyed substrate product will be obtained. However, in the preferred embodiment of this invention, the dye sold commercially by Geigy under the trade name Reactone Red 2B is used. This dye is reported in the literature (Ackermann and Dussy in Melliand's Textilber, vol. 42, p. 1167, 1961) to have the following structure:

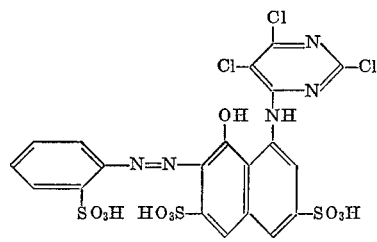

The water-soluble dyed substrate is obtained in accordance with the practice of this invention by coupling the starch starting material in an alkaline solution with a suitable reactive dye, and removing all unreacted dye from the product obtained. The temperature and duration of the reaction, as well as the ratio of starch to dye and alkaline concentration are all dependent variables which may be changed to a considerable extent and still yield the desired soluble substrate of this invention. However, for ease of operation, it has been found that conducting the reaction at room temperature (from about 20° C. to about 30° C.) for about 18 hours using a starch to dye ratio of from about 2.5:1 to about 100:1, preferably about 4:1, and alkaline concentrations of from about 0.1 to about 1.5 N, is practical and therefore preferred. The alkali in the resulting mixture is then neutralized with an aqueous solution of an acid, for example, aqueous hydrochloric acid.

The exact chemical structure of the soluble dyed substrate of this invention is not known, but it is believed that, similar to the manner in which the reactive dyes couple with alkali treated cellulose, the dyes also combine with the free hydroxyl groups of the starch, amylose, or amylopectin employed. See for example U.S. Pat. Nos. 1,886,480; 3,044,843; and 3,029,123. An empirical formula of $(C_6H_{10}O_5)n$—D has been assigned to these novel substrates, wherein $n$ is al arge whole number, $(C_6H_{10}O_5)n$ represents a naturally occurring polymer such as starch, amylose, or amylopectin, and D is the residue of any reactive dye.

It is essential that all unreacted dye be removed from the above reaction mixture in order that the resulting dyed substrate be suitable for use in the determination of amylase acivity: the presence of any free dye in the substrate would seriously interfere with test results, since the measure of amylase activity in this assay is by means of optical density. Conventional procedures used in the textile field for the removal of unreacted dye from dyestuff materials, such as described in U.S. Pat. No. 3,304,297 (Wegmann et al.), involve the use of absolute alcohol. However, these procedures had been found to have an adverse effect on the water solubility of the purified dyed substrate obtained and were therefore considered unacceptable.

It has now been found quite surprisingly, that the unreacted dye can be removed from a water soluble dyed substrate by a multiple precipitation process wherein the temperature and the concentrations of alcohol and salt are carefully controlled; the solubility in water of the subsequently purified dyed substrate product remains unaffected. The procedure involves controlling the temperature of all reactions while adding to the unpurified dyed substrate reaction mixture which contains a certain concentration of salt as a result of neutralization, a dilute alcohol solution to provide a specific concentration of alcohol in the total reaction mixture, whereby precipitation of the dyed substrate is achieved. The supernatant fluid containing salt and free dye is removed and the partially purified dyed substrate precipitate is then re-dissolved in water or an aqueous solution containing salt and/or alcohol. Depending on which solvent has been used to re-dissolve the precipitate, additional amounts of salt and alcohol are added to the solution to provide the concentrations at which the dyed substrate will re-precipitate. These re-dissolving/re-precipitating steps are continued at a controlled temperature until the supernatant fluid from the last precipitation is substantially free of dye color. Suitable alcohols which may be used in the above procedure include 1 to 3 carbon alcohols; methanol is preferred. Among the salts which are suitable, there may be mentioned inorganic salts such as sodium chloride, potassium chloride, sodium, sulfate, potassium sulfate and the like. Of these, sodium chloride is preferred.

In order to be sure that all free dye has been removed by this improved multiple precipitation process, it has been found that use of the monitoring procedure of our previously mentioned co-pending application, U.S. Ser. No. 100,373, filed Dec. 21, 1970, is particularly valuable. A sample of the supposedly purified dyed substrate is dissolved in water and the alcoholic tannic acid precipitating agent is added, as described in U.S. Ser. No. 100,373, filed Dec. 21, 1970. Preferably, an alcoholic tannic acid solution of 50% methanol containing 1% tannic acid, buffered to a pH of 5.35 with 0.1 N benzoic acid/sodium benzoate buffer and brought to a temperature of 25° C., is used as the precipitating agent. The presence of dye color in the supernatant fluid of this test sample indicates that some free dye remains, and the re-dissolving/re-precipitating steps must be carried out once more, followed by monitoring of a test sample. In practice, it is usually possible, by careful observation of the supernatant fluid, to repeat the precipitation steps a sufficient number of times so that monitoring the test sample is performed as the final step, assuring complete dye removal.

As has been previously stated, the multiple precipitation purification process of this invention is temperature dependent, and as a result, specific concentrations of salt and alcohol are required for the precipitation and re-dissolving procedures at different temperatures. Concentrations, and the temperatures at which they are employed are critical and must be carefully controlled. For example, it has been found that at room temperature (normally considered to be 23° C. to 26° C.) precipitation of the dyed substrate from a reaction mixture containing from 0.14% to 1.7% salt, preferably 0.17% to .56%, most preferably 0.21% salt as a result of neutralization will be achieved by adding a sufficient amount of alcohol to provide 25% to 34% alcohol, preferably 27% to 32%, most preferably 30% alcohol, based on the total vcolume of the dyed substrate solution. The supernatant fluid containing free dye, alcohol and salt is removed but the resulting partially purified dyed substrate precipitate may have entrapped therein small amounts of alcohol and salt, along with some remaining free dye.

The partially purified dyed substrate can then be re-dissolved in one of the following solutions: water, an aqueous salt solution which provides not more than 1.7% salt in the total volume of dyed substrate solution, an aqueous alcohol solution which provides not more than 34% alcohol in the total dyed substrate solution, or an aqueous solution containing salt and alcohol in concentrations below the minimum required for precipitation, i.e. below 0.14% salt and below 25% alcohol, in the total dyed substrate solution. The dyed starch substrate can now be re-precipitated by adjusting the concentrations of salt and alcohol in the dyed substrate solution to the percentages given above for the initial precipitation reaction, i.e. 0.14% to 1.7%, preferably 0.17% to 0.56%, and most preferably 0.21% salt, and 25% to 34%, preferably 27% to 32%, most preferably 30% alcohol based on the total volume of the solution. Thus, the re-dissolving/re-precipitating process can be repeated until the supernatant fluid is free of dye color. It is also critical, for purification procedures conducted at room temperature, that the added alcohol solution be of 80% or lower concentration, and that this solution be added very slowly to the dyed starch reaction mixture. The rapid addition of absolute alcohol or of highly concentrated solution, while providing the required final concentrations specified, has been found to yield a ball-like precipitate which cannot be re-dissolved for further purification.

Although the multiple precipitation process may be carried out at room temperature, it is most desirable to carry out the procedure at a lower temperature, i.e. at 4° C. since at this temperature, lower concentrations of alcohol may be used. At 4° C., to precipitate the dyed substrate, the necessary concentrations of alcohol based on the total volume of the dyed sybstrate reaction mixture containing 0.14 to 4.5% salt, preferably 0.34% to 1.04%, most preferably 0.61% salt, are 10.5% to 21%, preferably 11.5% to 18%, and most preferably 14%. Subsequently, the partially purified precipitated dyed substrate can be re-dissolved in one of the following solutions: water, an aqueous salt solution providing not more than 4.5% salt in the total volume of dyed substrate solution, an aqueous alcohol solution providing not more than 21% alcohol in the total volume of dyed substrate solution, or an aqueous solution containing salt and alcohol in concentrations below the minimum required for precipitation, i.e. below 0.14% salt and below 10.5% alcohol, in the total dyed substrate solution. Reprecipitation of the dyed substrate is achieved by adjusting salt and alcohol concentrations to the percentages previously given for the initial precipitation, i.e. 0.14% to 4.5%, preferably 0.34% to 1.04%, most preferably 0.61% salt and 10.5% to 21%, preferably 11.5% to 18%, most preferably 14% alcohol, based on the total volume of solution. At 4° C., it is critical that the alcohol solution added be of a relatively dilute concentration, for example, 40% or lower, and that this solution be added very slowly to the dyed starch or solution in order to preserve the solubility characteristics of the dyed substrate.

For operating temperatures different from those above, other effective concentrations of salt and alcohol could obvisously be determined from the parameters given.

The purified water soluble dyed substrate prepared according to the process of the instant invention is suitable for use in the improved amylase assay described in U.S. Ser. No. 771,354, filed Oct. 28, 1968. According to U.S. Ser. No. 771,354, and aqueous solution of the purified dyed substrate must be buffered to a pH of from about 6.5 to about 7.8 with a suitable buffering agent for use in the amylase assay. A 0.1 M anhydrous dibasic potassium phosphate, and 0.1 M monobasic potassium phosphate buffer system which maintains a pH of about 7, is preferred. Small quantities of an agent which will yield chloride ions are also needed to activate the amylase during the assay: a dilute aqueous solution of sodium chloride to provide a concentration of from about 0.005 molar to about 0.05 molar in the final assay media has been found to be effective.

The assay media as described above can be stored as such, preferably at refrigeration temperatures, or lyophilized (free-dried) for preservation, and reconstituted with water at the time the assay is conducted. Alternately, the dyed substrate product may be lyophilized as it is prepared, and the buffering agent and material providing chloride ion may be added just prior to use in an assay.

In carrying out the assay for amylase activity, from about 0.5 to about 2 ml. of a water solution containing about 1% of the dyed soluble substrate, buffered to a pH of from about 6.5 to about 7.8 and containing sufficient chloride ion for activation of the amylase, is incubated with a small amount (from about 0.1 to about 0.2 ml.) of fluid sample whose activity is to be determined. The incubation is conducted for about 10 minutes at temperatures of about 37° C. At the end of the incubation period, all undigested dyed substrate and any protein matter present in the fluid sample being assayed are removed by using, as the precipitating agent, 1% tannic acid solution in about 50% methanol, buffered to a pH of about 5.35, and brought to a temperature of about 25° C. precipitate formed is removed by centrifugation. The separated residue is discarded and the optical density of the clear supernatant fluid remaining is determined, at the absorption maximum for the particular dye used. The optical density (absorbance) is a linear function of the concentration of amylase in the fluid samples being tested and when suitably calibrated, the amylase concentration may be read directly. A blank assay is run in which the precipitating agent is added before the enzyme sample. The optical density of the blank is subtracted from the optical density of the test sample to eliminate the effect of assay reagents on the values obtained for the enzymatic hydrolysis products.

In order to illustrate the present invention the following examples are given:

Example I.—Preparation of dyed amylopectin—multiple precipitation method at 4° C.—dissolving the precipitate in methanol Forty grams of amylopectin (Amioca Starch 51–6002) are dissolved in 1000 ml. of distilled water and stirred. One hundred ml. of a 10% aqueous solution of Geigy Reaction Red 2B are added, followed by 100 ml. of 2.5 N NaOH solution, and the batch is stirred until it becomes too viscous for stirring. The batch is covered and allowed to stand at room temperature (23° to 26° C.) for 18 hours. Add 1 N hydrochloric acid (about 250 ml.), with stirring to neutralize the reaction mixture, (pH of 7) then dilute with distilled water to a volume of 1500 ml. and mix well. Remove all unreacted dye from this reaction mixture by allowing all solutions to come to 4° C. and carrying out all reactions at this temperature: to 1000 ml. dyed starch add slowly, with vigorous stirring, 1000 ml. 28% methanol; allow to settle (5 minutes) and decant supernatant; to the resulting precipitate add, with stirring, 1000 ml. 14% methanol; after all the precipitate has been dissolved, re-precipitate the substrate with 35 ml. of 3.0 M sodium chloride; repeat re-precipitation and re-dissolving steps at least twice. Check for the presence of any remaining free dye by adding a specially prepared alcoholic tannic acid precipitating agent to an aqueous solution of the purified dyed substrate, and determining the absorbance of the supernatant fluid after the dyed substrate has been precipitated. The precipitating agent is prepared from a 1% tannic acid solution, in 50% methanol, buffered with 0.1 M benzoic acid/sodium benzoate buffer to a pH of 5.35 and brought to a temperature of 25° C. The purified dyed substrate from the last precipitation is dissolved in 1000 ml. of distilled water. The relative conventration of dyed substrate in a 1 ml. sample of this solution is calculated in order to determine the amount of solution to be reacted with 5 ml. of the above prepared precipitating agent. This is done by diluting the 1 ml. sample to 100 ml. with distilled water, taking an optical density reading against water at 540 nanometers, comparing with a known standard solution, and calculating to obtain the required amount for reaction with the precipitating agent. The calculated amount, which usually falls somewhere between 2 and 3 ml., is taken from the aqueous dyed substrate solution, and diluted with distilled water to a 10 ml. volume. 5 ml. of the alcoholic tannic acid precipitating agent is added to 1 ml. of this last dilution, in a centrifuge tube, and mixed; 0.2 ml. of a protein solution (about 7%) is then added to the centrifuge for ten minutes and the absorbance of the supernatant fluid is read at 540 nanometers. If the absorbance is greater than 0.020, purification of the dyed substrate to remove free dye must be continued by re-precipitation and re-dissolving procedures previously described until an absorbance of 0.020 is obtained.

When the dyed substrate has been completely purified, the concentration of the dyed substrate is adjusted so that the absorbance of a 1 ml. aqueous solution, diluted to 100 ml. with distilled water, gives an absorbance of 0.140 at 540 nanometers. The pH of the dyed substrate solution is adjusted to 7.0 with a 0.1 M phosphate buffer. The concentration of sodium chloride in the final solution (at least 0.005 M) is sufficient for amylase assay. This final solution may be used as such in the assay described in Example 4 below or it may be lyophilized and reconstituted at time of use.

Example II.—Multiple precipitation method at 4° C.—dissolving the precipitate

Prepare the dyed amylopectin as described in Example I. Remove all unreacted dye from the reaction mixture by allowing all solutions to come to 4° C. and carrying out all procedures at this temperature; to 1000 ml. dyed starch add slowly, with vigorous stirring, 1000 ml. 28% methanol; allow to settle (5 minutes) and decant supernatant; to the resulting precipitate add, with stirring, 1000 ml. water; after the precipitate has been dissolved, re-precipitate the substrate with 1000 ml. 28% methanol containing 0.61% NaCl; repeat re-dissolving and re-precipitation steps at least twice; monitor the purified dyed substrate solution as in Example I to insure that all free dye has been removed. Prepare the final solution of the dyed substrate as in Example I.

Example III.—Multiple precipitation method at room temperature—dissolving the precipitate in water Prepare the dyed amylopectin as described in Example I. Remove all unreacted dye from the reaction mixture by carrying out all procedures at room temperature: to 1000 ml. dyed starch add slowly, with vigorous stirring, 1000 ml. 60% methanol; allow to settle 5 minutes and decant supernatant; to the resulting precipitate add, with stirring, 1000 ml. water; after the precipitate has been dissolved, re-precipitate the substrate with 1000 ml. 60% methanol containing 0.21% sodium chloride; repeat re-dissolving and re-precipitating steps at least twice; monitor the purified dyed substrate solution as in Example I to insure that all free dye has been removed. Prepare the final solution of the dyed substrate as in Example I.

Example IV 0.2 ml. of a sample of blood serum is incubated with 1 ml. of the buffered soluble dyed substrate obtained in accordance with Example I for 10 minutes at 37° C. At the end of this incubation period, 5 ml. of a 1% tannic acid solution, in 50% methanol, buffered with 0.1 M benzoic and sodium benzoate buffer to a pH of 5.35, is brought to a temperature of 25° C. and added to the assay media. The resulting precipitate is removed by centrifugation. The optical density of the supernatant solution is then determined at a wave length of 540 nanometers. A blank assay is run by adding the buffered alcoholic tannic acid precipitating agent before the enzyme source. The optical density of this blank is subtracted from the optical density of the unknown. As a reference standard, serum containing a known concentration of amylase is also subjected to the test. Since the amount of alcohol soluble, dyed hydrolytic fractions formed by the enzymatic hydrolysis of the substrate by the amylase present is proportional to the enzyme concentration, the amount of amylase present in the unknown sample can be readily calculated.

Example V

A soluble substrate is prepared from amylose and a reactive dye, in an analogous fashion to the procedure of Example I. This product is used in the assay procedure of Example IV, and the results obtained are equally satisfactory.

Example VI

A soluble substrate of dyed corn starch and a reactive dye is prepared according to the procedure of Example I and employed in the assay procedure of Example IV. The results obtained are equally satisfactory.

It is understood that the foregoing detailed description is given merely by way of illustration and that many variations may be made therein without departing from the spirit of our invention.

Having described our invention, what we desire to secure by Letter Patent is:

1. A method for preparing a water-soluble dyed substrate having the formula:

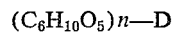

$$(C_6H_{10}O_5)n\text{—}D$$

wherein $n$ is a large whole number, $(C_6H_{10}O_5)n$ is a polysaccharide selected from the group consisting of starch, amylose and amylopectin, and D is the residue of a reactive dyestuff, which comprises:

(1) Incubating an alkaline solution of the polysaccharide with a reactive dye;

(2) Neutralizing the dyed substrate reaction mixture of (1) to provide a salt concentration of from about 0.14% to about 4.5%, based on the total volume of the reaction mixture;

(3) Bringing the reaction mixture of (2) to a temperature ranging from about 4° C. to about 26° C. and maintaining the temperature throughout all subsequent purification procedures;

(4) Adding to the reaction mixture of (3), an aqueous alcohol solution which provides from about 10.5% to about 34% alcohol, based on the total volume of the reaction mixture, to precipitate the dyed substrate;

(5) Separating the partially purified dyed substrate precipitate of (4) from the supernatant fluid containing salt, alcohol and free dye;

(6) Re-dissolving the partially purified dyed substrate from (5) in a solution selected from the group consisting of:
  (a) Water,
  (b) An aqueous salt solution which provides up to about 4.5% salt in the total volume of dyed substrate solution,
  (c) An aqueous alcohol solution which provides up to about 34% alcohol in the total volume of dyed substrate solution, and
  (d) An aqueous solution containing less than about 0.14% salt and less than about 10.5% alcohol in the total volume of dyed substrate solution;

(7) Adjusting the salt concentration in the dyed substrate solution from (6) to from about 0.14% to about 4.5% and the alcohol concentration to from about 10.5% to about 34%, based on the total volume of dyed substrate solution, in order to re-precipitate the dyed substrate; and (8) Repeating Steps (6) and (7) if necessary until a final supernatant fluid from the re-precipitation step is free of all dye color.

2. A method according to claim 1 wherein, in Step 3, the reaction mixture of (2) is brought to a temperature of about 4° C. and this, temperature is maintained throughout the subsequent purification procedures.

3. A method according to claim 2 which comprises:
(1) Incubating an alkaline solution of polysaccharides with a reactive dye;
(2) Neutralizing the dyed substrate reaction mixture of (1) to provide a salt concentration of from about 0.14% to about 4.5%, based on the total volume of the reaction mixture;
(3) Adding to the reaction mixture of (2), an aqueous alcohol solution which provides from about 10.5% to about 21% alcohol, based on the total volume of the reaction mixture, to precipitate the dyed substrate;
(4) Separating the partially purified dyed substrate precipitate of (3) from the supernatant fluid containing salt, alcohol and free dye;
(5) Re-dissolving the partially purified dyed substrate from (4) in a solution selected from the group consisting of:
  (a) Water,
  (b) An aqueous salt solution which provides up to about 4.5% salt in the total volume of dyed substrate solution,
  (c) An aqueous alcohol solution which provides up to about 21% alcohol in the total volume of dyed substrate solution, and
  (d) An aqueous solution containing less than about 0.14% salt and less than about 10.5% alcohol in the total volume of dyed substrate solution;
(6) Adjusting the salt concentration in the dyed substrate solution from (5) to from about 0.14% to about 4.5% salt and the alcohol concentration to form about 10.5% to about 21%, based on the total volume of dyed substrate solution, in order to re-precipitate the dyed substrate; and (7) Repeating Steps (5) and (6) if necessary, until a final supernatant fluid from the re-precipitation step is free of all dye color.

4. A method according to claim 3 which comprises:
(1) Incubating an alkaline solution of the polysaccharide with a reactive dye;
(2) Neutralizing the dyed substrate reaction mixture of (1) to provide a salt concentration of from about 0.34% to about 1.04%, based on the total volumes of the reaction mixture;
(3) Adding to the reaction mixture of (2), an aqueous alcohol solution which provides from about 11.5% to about 18% alcohol, based on the total volume of the reaction mixture, to precipitate the dyed substrate;
(4) Separating the partially purified dyed substrate precipitate of (3) from the supernatant fluid containing salt, alcohol and free dye;
(5) Re-dissolving the partially purified dyed substrate from (4) in a solution selected from the group consisting of:
  (a) Water,
  (b) An aqueous salt solution which provides up to about 1.04% salt in the total volume of dyed substrate solution,
  (c) An aqueous alcohol solution which provides up to about 18% alcohol in the total volume of dyed substrate solution, and
  (d) An aqueous solution containing less than about 0.14% salt and less than about 10.5% alcohol in the total volume of dyed substrate solution;
(6) Adjusting the salt concentration in the dyed substrate solution from (5) to from about 0.34% to about 1.04% salt and the alcohol concentration to from about 11.5% to about 18%, based on the total volume of dyed substrate solution, in order to re-precipitate the dyed substrate; and
(7) Repeating Steps (5) and (6) if necessary, until a final supernatant fluid from the re-precipitation step is free of all dye color.

5. A method according to claim 3 which comprises:
(1) Incubating an alkaline solution of the polysaccharide with a reactive dye;
(2) Neutralizing the dyed substrate reaction mixture of (1) to provide a salt concentration of about 0.61%, based on the total volume of the reaction mixture;
(3) Adding to the reaction mixture of (2), an aqueous alcohol solution which provides about 14% alcohol;
(4) Separating the partially purified dyed substrate precipitate of (3) from the supernatant fluid containing salt, alcohol and free dye;
(5) Re-dissolving the partially purified dyed substrate from (4) in a solution selected from the group consisting of:
  (a) Water,
  (b) An aqueous salt solution which provides up to about 0.61% salt in the total volume of dyed substrate solution,
  (c) An aqueous alcohol solution which provides up to about 14% alcohol in the total volume of dyed substrate solution,
  (d) An aqueous solution containing less than abous 0.14% salt and less than about 10.5% alcohol in the total volume of dyed substrate solution;
(6) Adjusting the salt concentration in the dyed substrate solution from (5) to about 0.61% and the alcohol concentration to about 14% based on the total volume of dyed substrate solution, in order to re-precipitate the dyed substrate; and
(7) Repeating Steps (5) and (6) if necessary, until a final supernatant fluid from the re-precipitation step is free of all dye color.

6. A method according to claim 5 wherein the polysaccharide is amylopectin, and the reactive dye has the formula:

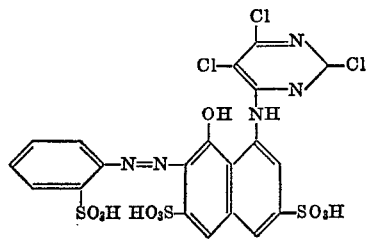

7. A method according to claim 1 wherein, in Step 3 the reaction mixture of (2) is brought to a temperature of from about 23° C. to about 26° C. and this temperature is maintained throughout all subsequent purification procedures.

8. A method according to claim 7 which comprises:
(1) Incubating an alkaline solution of the polysaccharide with a reactive dye;
(2) Neutralizing the dyed substrate reaction mixture of (1) to provide a salt concentration of from about 0.14% to about 1.7%, based on the total volume of the reaction mixture;
(3) Adding to the reaction mixture of (2), an aqueous alcohol solution which provides from about 25% to about 34% alcohol, based on the total volume of the reaction mixture, to precipitate the dyed substrate;
(4) Separating the partially purified dyed substrate precipitate of (3) from the supernatant fluid containing salt, alcohol and free dye;
(5) Re-dissolving the partially purified dyed substrate from (4) in a solution selected from the group consisting of:
(a) Water,
(b) An aqueous salt solution which provides up to about 1.7% salt in the total volume of dyed substrate solution,
(c) An aqueous alcohol solution which provides up to about 34% alcohol in the total volume of dyed substrate solution, and
(d) An aqueous solution containing less than about 0.14% salt and less than about 25% alcohol in the total volume of dyed substrate solution.
(6) Adjusting the salt concentration in the dyed substrate solution from (5) to from about 0.14% to about 1.7% and the alcohol concentration to from about 25% to about 34%, based on the total volume of dyed substrate solution, in order to re-precipitate the dyed substrate; and
(7) Repeating Steps (5) and (6) if necessary, until a final supernatant fluid from the re-precipitation step is free of all dye color.

9. A method according to claim 8 which comprises:
(1) Incubating an alkaline solution of the polysaccharide with a reactive dye;
(2) Neutralizing the dyed substrate reaction mixture of (1) to provide a salt concentration of from about 0.17% to about 0.56%, based on the total volume of the reaction mixture;
(3) Adding to the reaction mixture of (2), an aqueous alcohol solution which provides from about 27% to about 32% alcohol, based on the total volume of the reaction mixture, to precipitate the dyed substrate;
(4) Separating the partially purified dyed substrate precipitate of (3) from the supernatant fluid containing salt, alcohol and free dye;
(5) Re-dissolving the partially purified dyed substrate from (4) in a solution selected from the group consisting of:
(a) Water,
(b) An aqueous salt solution which provides up to about 0.56% salt in the total volume of dyed substrate solution,
(c) An aqueous alcohol solution which provides up to about 32% alcohol in the total volume of dyed substrate solution, and
(d) An aqueous solution containing less than about 0.14% salt and less than about 25% alcohol in the total volume of dyed substrate solution;
(6) Adjusting the salt concentration in the dyed substrate solution from (5) to from about 0.17% to about 0.56% and the alcohol concentration to from about 27% to about 32% based on the total volume of dyed substrate solution, in order to re-precipitate the dyed substrate; and
(7) Repeating Steps (5) and (6) if necessary, until a final supernatant fluid from the re-precipitation step is free of all dye color.

10. A method according to claim 8 which comprises:
(1) Incubating an alkaline solution of the polysaccharide with a reactive dye;
(2) Neutralizing the dyed substrate reaction mixture of (1) to provide a salt concentration of about 0.21%, based on the total volume of the reaction mixture;
(3) Adding to the reaction mixture of (2), an aqueous alcohol solution which provides about 30% alcohol, based on the total volume of the reaction mixture, to precipitate the dyed substrate;
(4) Separating the partially purified dyed substrate precipitate of (3) from the supernatant fluid containing salt, alcohol and free dye;
(5) Re-dissolving the partially purified dyed substrate from (4) in a solution selected from the group consisting of:
(a) Water,
(b) An aqueous salt solution which provides up to about 0.21% salt in the total volume of dyed substrate solution,
(c) An aqueous alcohol solution which provides up to about 30% alcohol in the total volume dyed substrate solution, and
(d) An aqueous solution containing less than about 0.14% salt and less than about 25% alcohol in the total volume of dyed substrate solution;
(6) Adjusting the salt concentration in the dyed substrate solution from (5) to about 0.21% and the alcohol concentration to about 30% based on the total volume of dyed substrate solution, in order to re-precipitate the dyed substrate; and
(7) Repeating Steps (5) and 6) if necessary, until a final supernatant fluid from the re-precipitation step is free of all dye color.

11. A method according to claim 10 wherein the polysaccharide is amylopectin and the reactive dye has the formula:

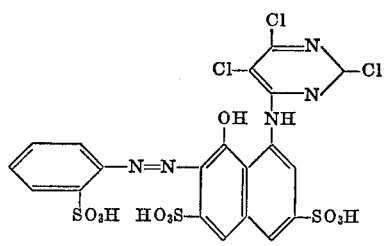

(References on following page)

References Cited

UNITED STATES PATENTS

| | | | |
|---|---|---|---|
| 3,304,297 | 2/1967 | Wegmann et al. | 260—144 |
| 3,597,322 | 8/1971 | Babson | 260—233.3 |

OTHER REFERENCES

Fernley: Biochem. Journal, volume 87, pp. 90–95 (1963).

Huggins et al.: Annals of Surgery, volume 128, pp. 668–678 (1948).

DONALD E. CZAJA, Primary Examiner

R. W. GRIFFIN, Assistant Examiner

U.S. Cl. X.R.

23—230 B